(12) United States Patent
Kasasaku et al.

(10) Patent No.: US 7,464,133 B1
(45) Date of Patent: Dec. 9, 2008

(54) SERVER/CLIENT SYSTEM

(75) Inventors: Takami Kasasaku, Kawasaki (JP); Yasuharu Yoshida, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/048,999

(22) PCT Filed: Oct. 5, 1999

(86) PCT No.: PCT/JP99/05497

§ 371 (c)(1),
(2), (4) Date: Feb. 20, 2002

(87) PCT Pub. No.: WO01/25934

PCT Pub. Date: Apr. 12, 2001

(51) Int. Cl.
*G06F 15/16* (2006.01)

(52) U.S. Cl. ................ 709/203; 709/224; 719/321; 710/2; 710/5; 710/52; 710/64

(58) Field of Classification Search ................ 709/203, 709/231, 223, 224; 719/321; 710/1, 2, 5, 710/52, 64
See application file for complete search history.

(56) References Cited

U.S. PATENT DOCUMENTS

| | | | | |
|---|---|---|---|---|
| 4,809,217 A | * | 2/1989 | Floro et al. | 710/52 |
| 5,047,922 A | * | 9/1991 | Borkar | 710/2 |
| 5,530,872 A | * | 6/1996 | Smeltzer et al. | 710/260 |
| 5,704,031 A | * | 12/1997 | Mikami et al. | 714/4 |
| 5,790,895 A | * | 8/1998 | Krontz et al. | 710/64 |
| 5,819,112 A | * | 10/1998 | Kusters | 710/36 |
| 5,923,852 A | | 7/1999 | Lee et al. | |
| 5,928,360 A | * | 7/1999 | Masuoka et al. | 713/2 |
| 5,978,857 A | * | 11/1999 | Graham | 719/312 |
| 5,996,024 A | * | 11/1999 | Blumenau | 719/326 |
| 6,047,319 A | * | 4/2000 | Olson | 709/223 |
| 6,073,183 A | * | 6/2000 | Slonim | 719/310 |
| 6,390,917 B1 | * | 5/2002 | Walker et al. | 463/20 |
| 6,421,748 B1 | * | 7/2002 | Lin et al. | 710/65 |
| 6,785,894 B1 | * | 8/2004 | Ruberg | 719/321 |
| 6,895,588 B1 | * | 5/2005 | Ruberg | 719/321 |
| 2001/0039595 A1 | * | 11/2001 | Kaihlaniemi | 709/321 |
| 2002/0038389 A1 | * | 3/2002 | Fujita | 709/321 |
| 2004/0107304 A1 | * | 6/2004 | Grun | 710/36 |
| 2004/0210897 A1 | * | 10/2004 | Brockway et al. | 717/174 |

FOREIGN PATENT DOCUMENTS

| | | |
|---|---|---|
| EP | 0604010 | 6/1994 |
| JP | A-4-333158 | 11/1992 |
| JP | A-6-75881 | 3/1994 |
| JP | A-6-214917 | 8/1994 |
| JP | A-10-154123 | 6/1998 |
| JP | A-10-301875 | 11/1998 |
| JP | 11275291 A | * 10/1999 |

* cited by examiner

*Primary Examiner*—Oanh Duong
(74) *Attorney, Agent, or Firm*—Arent Fox LLP (57) ABSTRACT

The server/client system comprises a server and at least one client which is connected to said server via a communication line and is provided with at least one I/O port, and is so configured that said server is provided with a device driver for controlling said I/O port, and a virtual I/O port for providing an interface having the same function as said I/O port for said device driver, for transmitting an input/output control signal from said device driver to said client, and for receiving an event from said client to indicate said event to said device driver, and said client is provided with a device handler which is connected to said virtual I/O port via said communication line and controls said I/O port.

8 Claims, 10 Drawing Sheets

Fig.1

-- Prior Art --

| ADDRESS ON COMMUNICATION LINE | VIRTUAL I/O PORT NUMBER | PHYSICAL I/O PORT CLASS | PHYSICAL I/O PORT NUMBER |
|---|---|---|---|
| 1 | 1 | COM | 1 |
| 2 | 2 | COM | 1 |
| 2 | 3 | COM | 2 |

Fig.11

DIAGNOSIS INDICATING AND RESULT DISPLAYING FUNCTIONS

START OF DIAGNOSIS                RESULT OF DIAGNOSIS

☑ CLIENT (1)     --------- OK
☐ I/O DEVICE 1   ---------
☐ I/O PORT 1     ---------
☐ I/O DEVICE 2   ---------
☐ I/O PORT 2     ---------

☐ CLIENT (m)     ---------
☐ I/O DEVICE 1   ---------
☐ I/O PORT 1     ---------
☐ I/O DEVICE 2   ---------
☐ I/O PORT 2     ---------

SERVER/CLIENT SYSTEM

CROSS-REFERENCE TO RELATED APPLICATION

This application is a National Stage entry of International Application No. PCT/JP99/05497, filed Oct. 5, 1999, the entire specification claims and drawings of which are incorporated herewith by reference.

FIELD OF THE INVENTION

The present invention relates to a server/client system and, particularly, to a server/client system wherein the quantity of the hardware resources of the client is small.

BACKGROUND OF THE INVENTION

Figure 1:
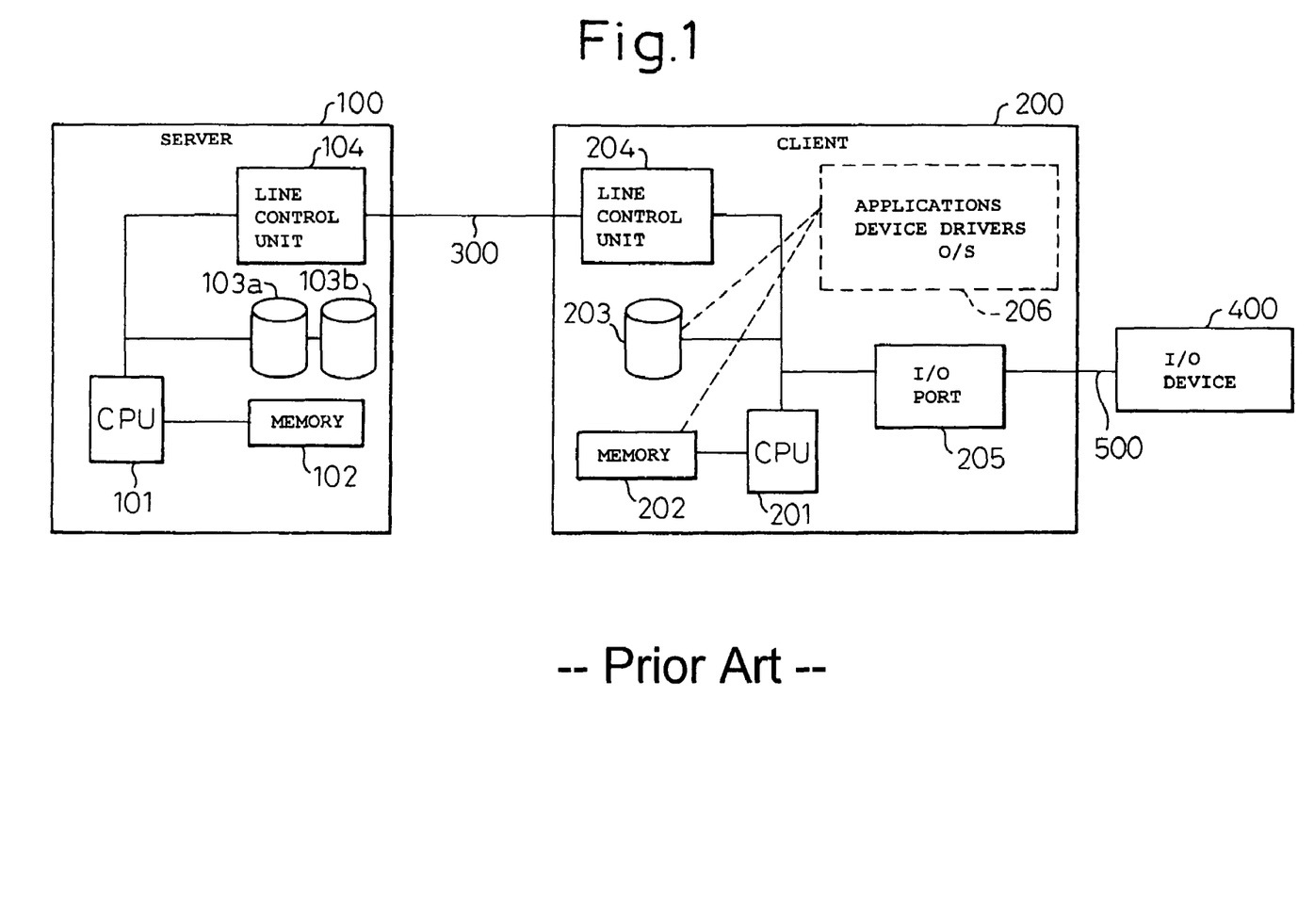
FIG. 1 is a block diagram showing the configuration of a conventional server/client system.

FIG. 1 shows a schematic hardware configuration of a conventional server/client system. In this figure, the reference numeral 100 denotes a server, and the reference numeral 200 denotes a client which is a personal computer or equivalent, and both of them are connected with a communication line 300. To the client 200, an I/O device 400 such as a printer, a memory card reader, or a bar-code reader is connected through a connecting line 500.

The server 100 of the conventional server/client system includes a CPU 101, a memory 102, hard disks 103a and 103b, and a line control unit 104. The hard disks in the server are usually duplicated (mirrored) so that in the case of a failure of one of the hard disks, the other one may take its place.

The client 200 includes a CPU 201, a memory 202, a hard disk 203, a line control unit 204, and an I/O port 205. In the hard disk 203, software 206, including various kinds of applications and device drivers, and an operating system (OS) for controlling the operation of the client 200, are installed.

The conventional server/client system is so configured, as shown in the figure, that the applications are operated on the client 200. For this reason, due to considerable increase in the size of the operating system and applications, and an increase in the number of device drivers, in recent years, the client is required to have high processing-ability, large hardware resources and large-capacity storage devices.

However, a hard disk often used as a hardware resource increases in cost with increasing in capacity and often breaks down. Thus, an increase in capacity of hardware resources is undesirable from the viewpoints of manufacturing cost as well as operational system cost. For this reason, it is required to reduce the burden on the processor of the client, and to reduce the hardware/software requirements of the client, with effective use of conventional applications and device drivers.

For this purpose, if the applications are operated on the server 100, and the screen and key-input data are transferred between the client 200 and server 100, the burden on the processor of the client 200 may be reduced, and the requirements of the hardware may be reduced accordingly. Since an I/O device is usually connected to the client near the user, a device driver is installed in the client.

If the applications are installed in the server and the device driver is operated on the client as mentioned above, there are the following problems in terms of the control of the I/O device.

(1) As the device driver in the client often depends on the O/S having a large code size, the device driver installed in the client increases the burden on the processor of the client, and a storage device for the O/S necessary for operating the device driver is required.

(2) As the interface between the application installed in the server and the device driver installed in the client is different from the one between the application and device driver installed in the client, the device driver must be recreated.

(3) If there are multiple kinds of I/O device, each driver must be recreated for the above reason (2).

(4) The version number of the device driver may be known only at the place where the client is installed.

(5) Diagnosis of the I/O device for the client may be performed only at the place where the client is installed.

(6) The device driver must be recreated every time the platform of the client is modified.

As mentioned above, if the application is operated on the server, and the device driver is operated on the client, decreasing the hardware/software requirements of the client and effective use of resources such as the conventional applications and device drivers are difficult for the above reasons (1), (2), and (3). In addition, efficient operation of the system is difficult as mentioned in the above (4), (5), and (6).

DISCLOSURE OF THE INVENTION

It is therefore the main object of the present invention to provide a server/client system by which an effective use of resources such as conventional applications and device drivers, and a considerable reduction in the quantity of hardware resources in a client are available.

An embodiment of the present invention for achieving the above object provides a server/client system comprising a server and at least one client which is connected to said server via a communication line and is provided with at least one I/O port, wherein said server is provided with a device driver for controlling said I/O port, and a virtual I/O port for providing an interface having the same function as said I/O port for said device driver, for transmitting an input/output control signal from said device driver to said client, and for receiving an event from said client to indicate said event to said device driver, and said client is provided with a device handler which is connected to said virtual I/O port via said communication line and controls said I/O port.

In this server/client system, as the same interface as the interface between the device driver and the I/O port of the conventional server/client system is realized in the server, all of the applications and device drivers used on the conventional client may be operated on the server. For this reason, a considerable reduction in the quantity of the hardware resources in the client may be possible, and the resources of the conventional applications and device drivers may be used in the server as they are and without any modification.

Furthermore, in the server/client system as configured above, by adding the function of identifying the address on the communication line of the client and each I/O port, to the virtual I/O port, a plurality of thin clients may be controlled by one server.

Furthermore, by adding the function of diagnosing the hardware of the clients to the virtual I/O port, the server which controls a plurality of clients may perform the hardware diagnosis of each client under one umbrella.

BRIEF DESCRIPTION OF THE DRAWINGS

The above mentioned and other objects, features, advantages, etc. of the present invention are described in detail below, together with the accompanying drawings showing embodiments of the present invention, wherein.

DESCRIPTION OF THE PREFERRED EMBODIMENTS

Figure 2:
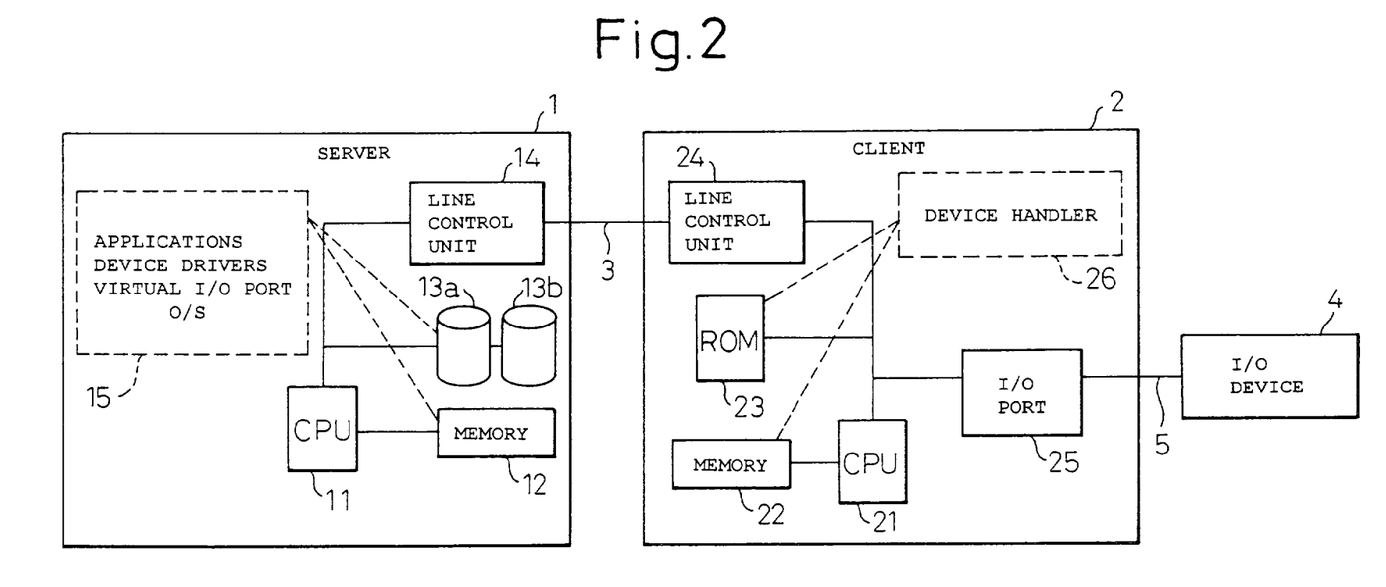
FIG. 2 is a block diagram showing the hardware configuration of a first embodiment of a server/client system according to the present invention.

FIG. 2 is a block diagram showing the hardware configuration of a first embodiment of a server/client system according to the present invention. As shown in FIG. 2, the server 1 of this embodiment comprises a CPU 11, storage devices such as a memory 12, and hard disks 13*a* and 13*b*, and a line control unit 14. In the duplicated hard disks 13*a* and 3*b*, software 15 is installed which includes several kinds of applications and device drivers conventionally installed in the client, a virtual I/O port which will be described later, and an O/S.

The client 2 comprises a CPU 21, storage devices such as a memory 22 and a ROM 23, a line control unit 24, and an I/O port 25. In this system, since applications and device drivers are installed in and operated on the server, the ROM 23 stores the software 26 which includes the software, i.e., a device handler, for converting the signals transmitted from the device drivers in the server 1 through the communication line 3 to the signals which can be input to the I/O port 25, and a built-in O/S for controlling the whole of client 2. Details of the function of the device handler will be described later.

In this embodiment, as the applications must not be operated on the client 2, the size of the software including the device handler and O/S is much smaller than a conventional system, and thus the software may be stored in the ROM. For this reason, a hard disk is not required in the client.

A hard disk is mainly responsible for the failure of a client in an server/client system, and a server/client system according to the present invention does not require any hard disk, thereby improving the system reliability significantly.

The communication line is, for example, a LAN (Local Area Network), etc.

Figure 3:
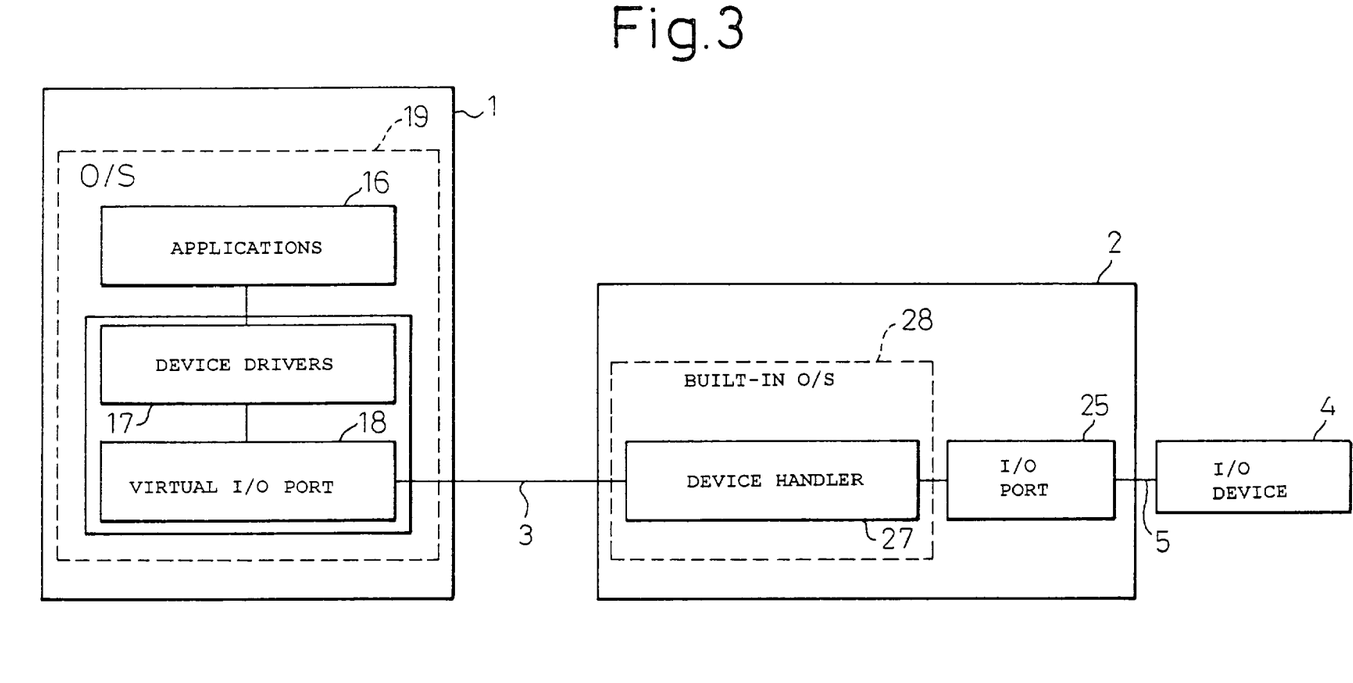
FIG. 3 is a block diagram showing the software configuration of the server/client system shown in FIG. 2.

FIG. 3 shows the software configuration of the server/client system shown in FIG. 2. In this embodiment, several kinds of applications 16, device drivers 17 for driving the several kinds of I/O device 4, a virtual I/O port 18 for converting the signals which have been input thereto via the communication line 3 to the signals which can be input to the device drivers 17, and O/S for controlling these pieces of software are installed in the server 1. As the O/S 19, existing O/S such as Windows 98 (trade mark), Windows NT (trade mark), or the like, which is the same as the one used if these pieces of software are in the client 2, may be used. Furthermore, it is possible, of course, to use the applications and device drivers which are used in existing system.

The client 2 includes the device handler 27 for converting the signals which have been input thereto via the communication line 3 to the signals which can be recognized by the I/O port 25, and for converting the signals from the I/O port 25 to the signals which can be transmitted through the communication line 3. In this embodiment, as the client 2 does not include any application and device driver which are large in size, and includes only the device handler which is small in size, the O/S 28 for controlling them may be a built-in O/S having a very simple configuration.

The virtual I/O port 18 in the server has basically the following functions.

It has an interface which functions as the I/O port 25 of the client 2, for the higher device driver 17.

It transmits the input/output control signal transmitted from the higher device driver 17 to the device handler 27 in the client, and receiving the event from the device handler 17 to notice it to the higher device driver 17.

The minimum function necessary for the device handler 27 of the client 2 is as follows.

It receives the input/output control signal transmitted from the virtual I/O port 18 of the server 1, performs the input/output control of the I/O port 25, and transmits the event transmitted from the I/O port to the virtual I/O port 18 of the server 1.

In the server/client system of this embodiment, as the virtual I/O port 18 is provided in the server 1 and the device handler 27 is provided in the client 2, conventional applications and device drivers may be operated on the server 1 without any modification, and thereby the hardware/software requirements of the hardware resources of the client 2 may be reduced considerably.

Figure 4:
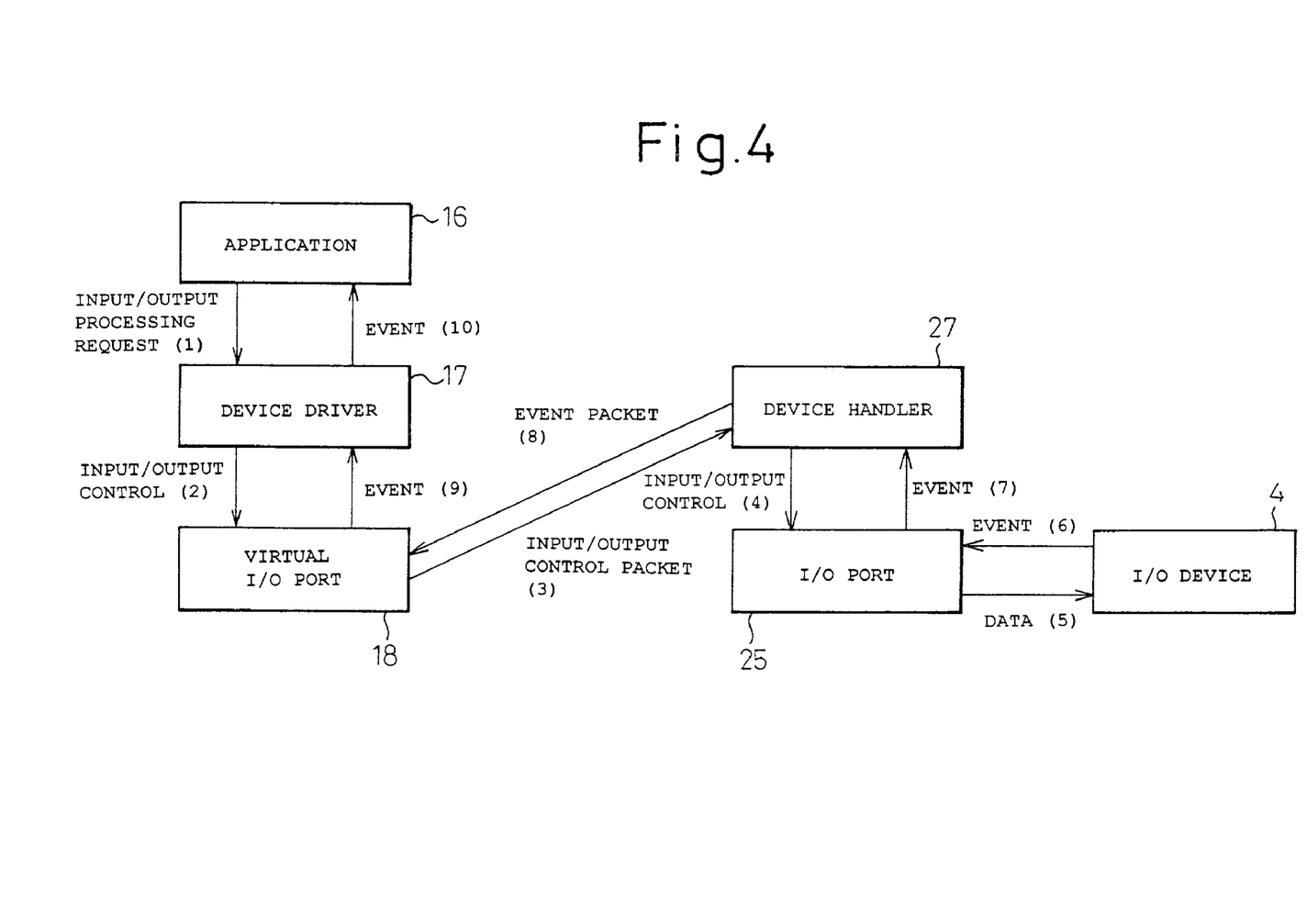
FIG. 4 shows the data flow between the application and the I/O device in the server/client system shown in FIG. 2 and FIG. 3.

Below are described more detail configurations of this system and the operation thereof, referring FIG. 4 which shows the data flow between the application 16 in the server 1 and the I/O device 4.

The data input to and output from the I/O device 4 by the applications 16 are as follows.

(1) The application 16 sends an input/output processing request (1) including data to be input/output, to the device driver 17.

(2) The device driver 17 performs the input/output control of the virtual I/O port according to input/output processing request (1).

(3) The virtual I/O port 18 converts input/output control signal (2) to the data to be sent out to the communication line 3, and transmits the data to the device handler 27 in the clients 2 in the form of input/output control packet (3).

(4) When the device handler 27 receives the input/output control packet (3), it interprets the contents of input/output control packet (3) and performs the input/output control (4) of the I/O port 25.

(5) The I/O port 25 converts input/output control signal (4) to data (5) to be sent out to the connecting line 5, transmits data (5) to the external I/O device 4, and controls it.

According to the above operations, the data input to and output from the I/O device 4 by the application 16 are performed.

Next, notice of an event from the I/O device 4 to the application 16 will be described.

(6) At first, the I/O device 4 outputs event (6) (such as the change of the control signal line) to the connecting line 5.

(7) The device handler 27 converts event (7) from the I/O port 25 to the data to be sent out to the communication line 3, and transmits the data to the virtual I/O port 18 in the form of event packet (8).

(8) When the virtual I/O port 18 receives event packet (8), it interprets the contents of event packet (8), and sends event (9) to the device driver 17.

(9) The device driver 17 sends event (10) to the application 16.

Above is described the data flow between the application 16 and the I/O device 4 in the server/client system of this embodiment.

Figure 5:
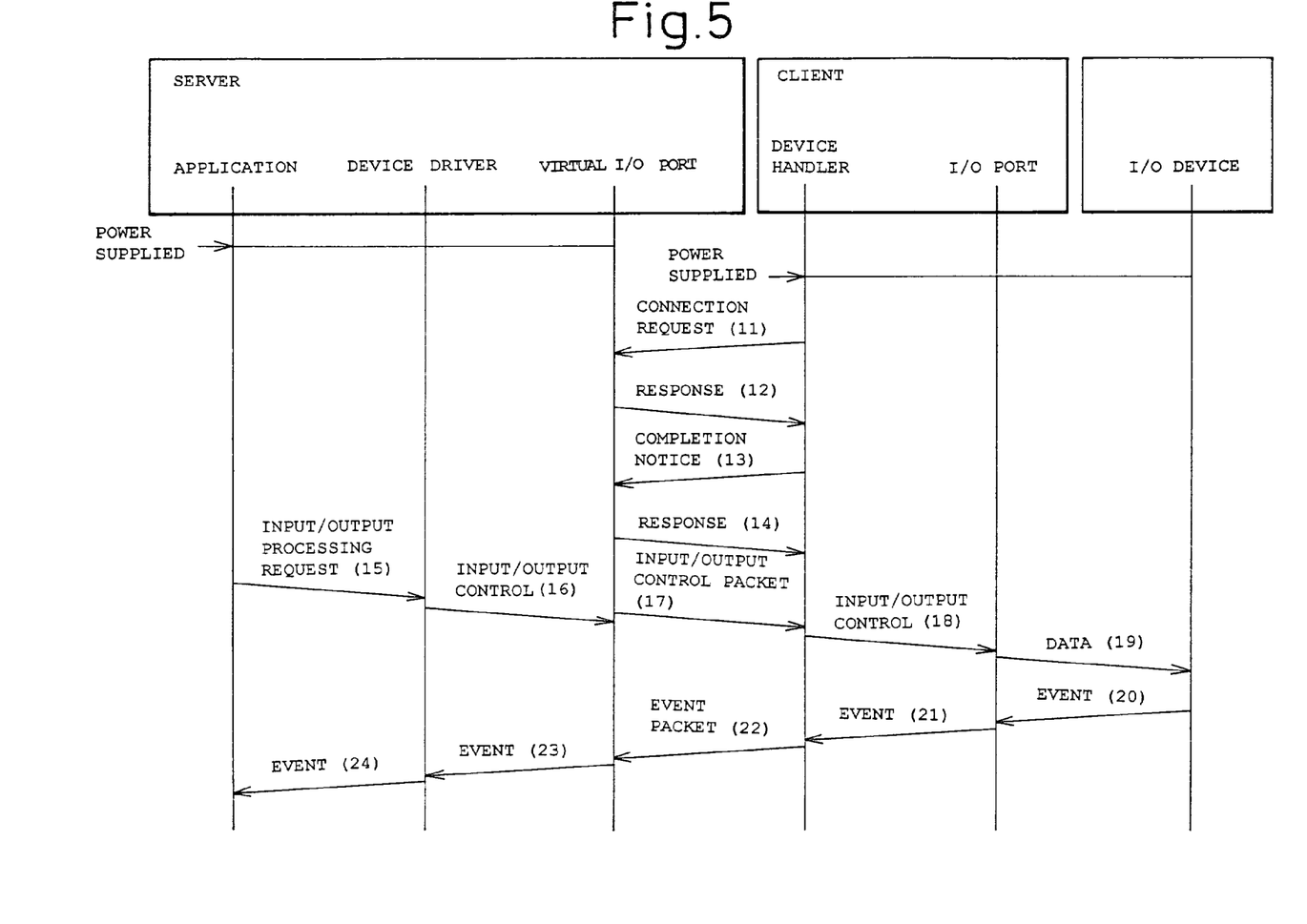
FIG. 5 shows the operation sequence of the server/client system shown in FIG. 2 and FIG. 3.

Next, the operation sequence of the server/client system of this embodiment will be described referring FIG. 5.

When the power is supplied to the server 1 and client 2, at first the connection between the virtual I/O port 18 and the device handler 27 is established. The establishment of this connection is performed with the negotiation between the virtual I/O port 18 and the device handler 27. That is, when the power is supplied to the client 2, the device handler 27 transmits a connection request (11) (broadcast) to request the establishment of the connection on the communication line to the virtual I/O port 18. If the power has been supplied to the server 1 and the virtual I/O port 18 has started, a response (12) to this is output from the virtual I/O port 18 to the device handler 27. Response (12) includes the mapping information about the address of the client 2 on the communication line, which has been predetermined with the setting function of the virtual I/O port 18, and about the class and number of the physical I/O port of the client 2. When the device handler 27 receives this response (12), it establishes the connection on the communication line, and performs the mapping of the physical I/O port according to the mapping information, and when the mapping has been completed, the device handler 27 transmits a mapping completion notice (13) to the virtual I/O port 18. When the virtual I/O port 18 receives this notice (13), it transmits a response (14) to this notice (13) to the device handler 27. At this time, the virtual I/O port 18 can accept the control from the device driver 17. If the control signal is transmitted to the virtual I/O port 18 before this time, the virtual I/O port 18 transmits the error signal to the device driver 17.

Next, the sequence of data input to and output from the I/O devices 4 by the application 16 will be described. The data flow in this case is as shown in FIG. 4.

At first, an input/output request (15) is accepted by the device driver 17, which performs the input/output control (16) of the virtual I/O port 18. The virtual I/O port 18 converts the input/output control (16) to the data to be sent out to the communication line, and transmits the data to the device handler 27 in the form of input/output control packet (17). When the device handler 27 receives input/output control packet (17), it interprets the contents of input/output control packet (17), and performs the input/output control (18) of the I/O port 25. The I/O port 25 outputs data (19) to the connecting line 5.

Next, the notice of an event from the I/O device 4 to the application 16 will be described.

When the I/O device 4 outputs an event (20) (such as the change of the control signal line) to the connecting line, the device handler 27 converts event (21) from the I/O port 25 to the data to be sent out to the communication line 3, and transmits the data to the virtual I/O port 18 in the form of event packet (22). When the virtual I/O port 18 receives event packet (22), it interprets the contents of event packet (22), and sends event (23) to the device driver 17. The device driver 17 sends event (24) to the application 16.

Figure 6:
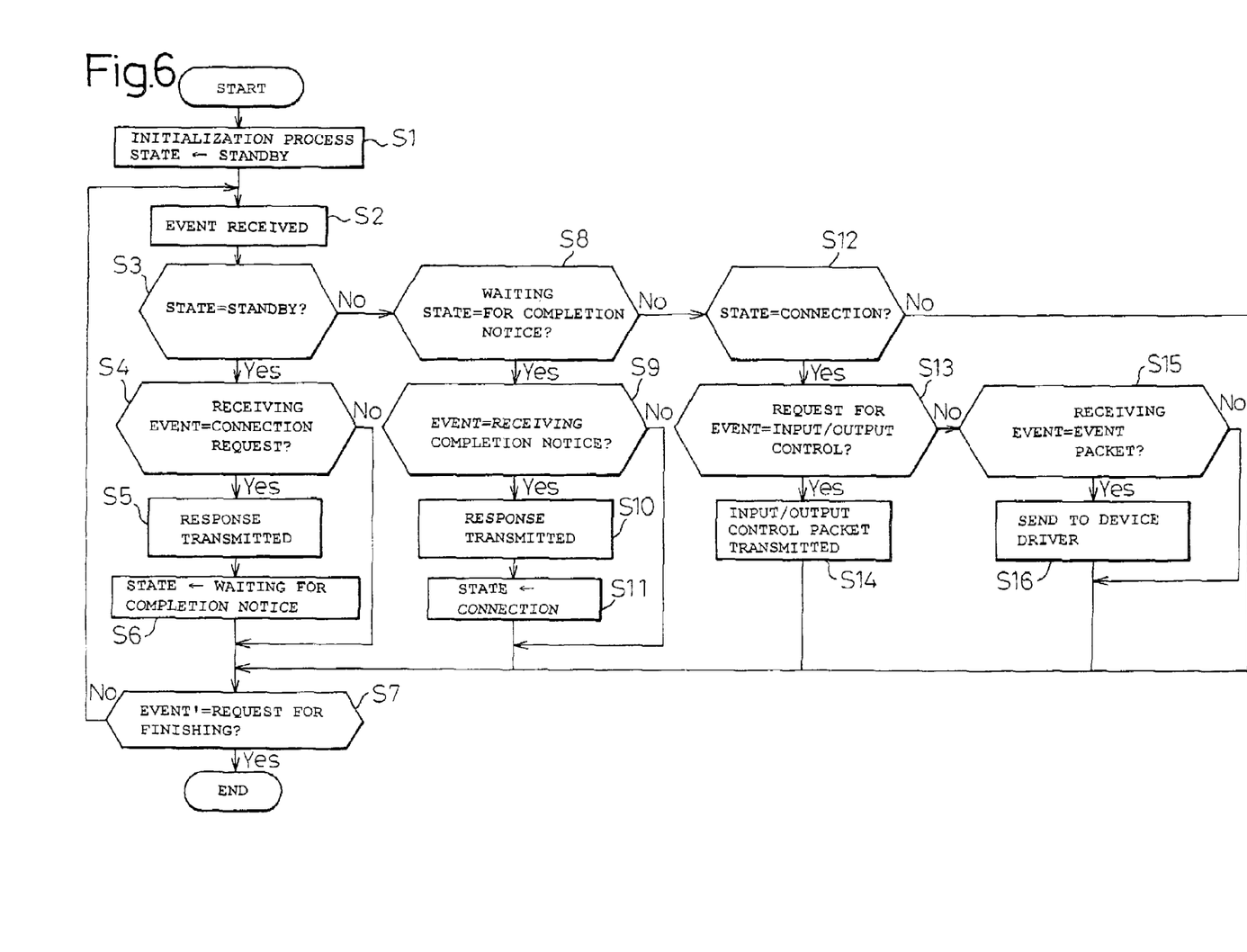
FIG. 6 is a flow chart depicting the function of the virtual I/O port of the server/client system shown in FIG. 2 and FIG. 3.

FIG. 6 is a flow chart depicting the function of the virtual I/O port 18. This flow chart depicts only the minimum function necessary for the virtual I/O port 18.

The following states are assumed as the internal states of the virtual I/O port 18.

(1) Standby: the state of waiting to receive the connection request from the client 2.

(2) Waiting for completion notice: the state of waiting for the notice of the completion of the mapping for the physical I/O port of the client 2.

(3) Connection: the state of being able to accept the control from the device driver 17 after receiving the notice of the completion of the mapping for the physical I/O port of the client 2.

For the above each state of the virtual I/O port, the following events are assumed.

(4) Receiving connection request: the event of receiving the connection request from the client 2

(5) Receiving completion notice: the event of receiving the notice of the completion of the mapping for the physical I/O port of the client 2.

(6) Request of input/output control: the event of requesting the input/output control from the device driver 17.

(7) Receiving event packet: the event of receiving an event packet from the client 2.

Referring the above states and events, the function of the virtual I/O port 18 is described below.

At step S1, in FIG. 6, the initialization process is performed, and then the virtual I/O port 18 is set to the "standby" state. Next, an event is received at step S2. At this time, if the state of the virtual I/O port 18 is the "standby" state (Yes at step S3), it is determined at step S4 whether the event is the "receiving connection request". If the event is the "receiving connection request" (Yes at step S4), the response is transmitted to the device handler at step S5, and the state is changed to the "waiting for completion notice" at step S6. If the event is not the "receiving connection request" at step S4 (No at step S4), it is determined at step S7 whether the event to be input next is the request of finishing, and if the event is the request of finishing (Yes at step S7), the operation of the virtual I/O port 18 is finished. If the event is not the request of finishing, the process is returned to step S2, and an event is received again, and then the later steps are executed.

If the state is not the "standby" at step S3 (No at step S3), it is determined whether the state is the "waiting for completion notice" at step S8. If the state is the "waiting for completion notice" (Yes at step S8), it is determined whether the event is the "receiving completion notice" at step S9. If the event is the "receiving completion notice" (Yes at step S9), the response is transmitted to the device handler 27 at step S10, and then the state is changed to the "connection" state (step S11). If the event is not the "receiving completion notice" at step S9 (No at step S9), the process goes to step S2 to receive an event again except that the event is a request to finish.

If the state is not the "waiting for completion notice" at step S8 (No at step S8), it is determined whether the state of the virtual I/O port 18 is "connection" state at step S12. If the state is the "connection" state (Yes at step S12), it is determined whether the event is the "request of input/output control" at step S13. In case of yes at step S13, the input/output control packet is transmitted to the device handler 27 at step S14. If the event is not the "request of input/output control" at step S13 (No at step S13), it is determined whether the event is the "receiving event packet" at step S15. In case of yes at step S15, the received packet is sent to the device driver 17. If the event is not the "receiving event packet" at step S15 (No at step S15), it is determined whether the event is the request of finishing at step S7. In case of yes at step S7, the process is finished, but in case of no, the process goes to step S2 to execute the later steps.

Figure 7:
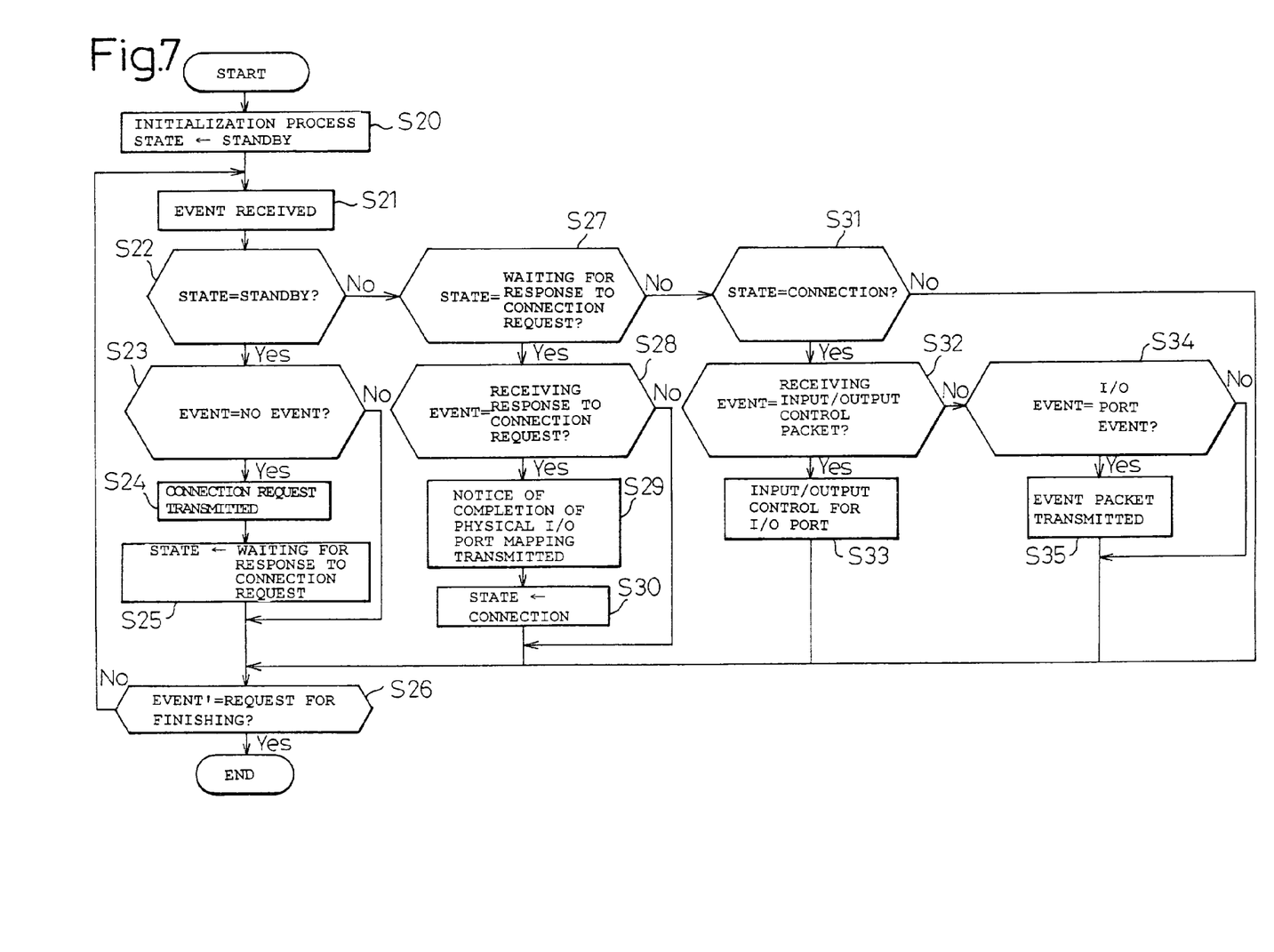
FIG. 7 is a flow chart depicting the function of the device handler of the server/client system shown in FIG. 2 and FIG. 3.

FIG. 7 is a flow chart depicting the function of the device handler 27. This flow chart depicts only the minimum function necessary for the device handler 27.

The following states (1) to (3) are assumed as the internal states of the device handler 27.

(1) Standby: the state just after the start of the client 12.

(2) Waiting for response to connection request: the state of waiting for a response from the server after transmitting the connection request is transmitted.

(3) Connection: the state of being able to accept an input/output control packet from the virtual I/O port 18 after transmitting the notice of completion of the mapping for the physical I/O port.

Furthermore, for the each state of the device handler 27, the following events (4) to (7) are assumed.

(4) No event: there is no event.

(5) Receiving response to connection request: the event of receiving a response from the server after transmitting the connection request.

(6) Receiving input/output control packet: the event of receiving an input/output control packet from the server.

(7) I/O port event: the event from the I/O port.

Next, referring FIG. 7, the processing procedure of the device handler 27 will be described.

At first, at step S20, the initialization process is performed, and the state is set to the "standby", and then an event is received at step S21. Next, it is determined whether the event is the "standby" at step S22. In case of yes, it is determined whether there is no event at step S23. If there is no event at step S23 (Yes at step S23), the connection request is transmitted to the virtual I/O port 18 of the server 1 (step S24), and the state is changed to the "waiting for response to connection request" (step S25). Next, it is determined whether the event is the request to finish (step S26), and if the event is not the request to finish, the process returns to step S21 and the later steps are executed again.

If the state of the device handler 27 is not the "standby" at step S22 (No at step S22), it is determined whether the state is the "waiting for response to connection request" at step S27. In case of yes, it is determined whether the event is the "receiving response to connection request" at step S28. In case of yes at step S28, the notice of completion of the mapping for the physical I/O port is transmitted to the virtual I/O port 18, and then the state of the device handler 27 is changed to the "connection" (step S30).

If the state of the device handler 27 is not the "waiting for response to connection request" at step S27 (No at step S27), it is determined whether the state is the "connection" at step S31. In case of yes at step S31, it is determined whether the event is the "receiving input/output control packet" at step S32. In case of yes at step S32, the input/output control is performed for the I/O port 25 at step S33.

If the event is not the "receiving input/output control packet" at step S32, it is determined whether the event is the "I/O port event" at step S34. In case of yes, this event packet is transmitted to the virtual I/O port at step S35. If the event is not the "I/O port event" at step S34, it is determined whether the event is the request of finishing at step S26. In case of yes at step S26, the process is finished, but in case of no, the process returns to step S21 and the later steps are executed again.

As described above, the first embodiment of the server/client system according to the present invention is so configured that: the virtual I/O port 18 is provided in the server; the device handler 27 is provided in the client; the process from the device driver on the upper layer of the virtual I/O port 18 is transferred to the device handler 27; the control of the I/O port 25 is performed by the device handler 27; and the event from the I/O port 25 is transferred to the virtual I/O port 18 and, thereby, the applications and device drivers which are operated conventionally on a client may be operated on the server 1 without any modification. For this reason, the burden on process of the client 2 may be extremely reduced, and thereby it is not required to mount a large capacity storage device such as a hard disk on the client 2.

Further, in the server/client system of this embodiment shown in FIG. 2 and FIG. 3, an interface used in the conventional server/client system having a device driver in the client is adopted as the interface between the virtual I/O port 18 and the device driver 17.

Figure 8A:
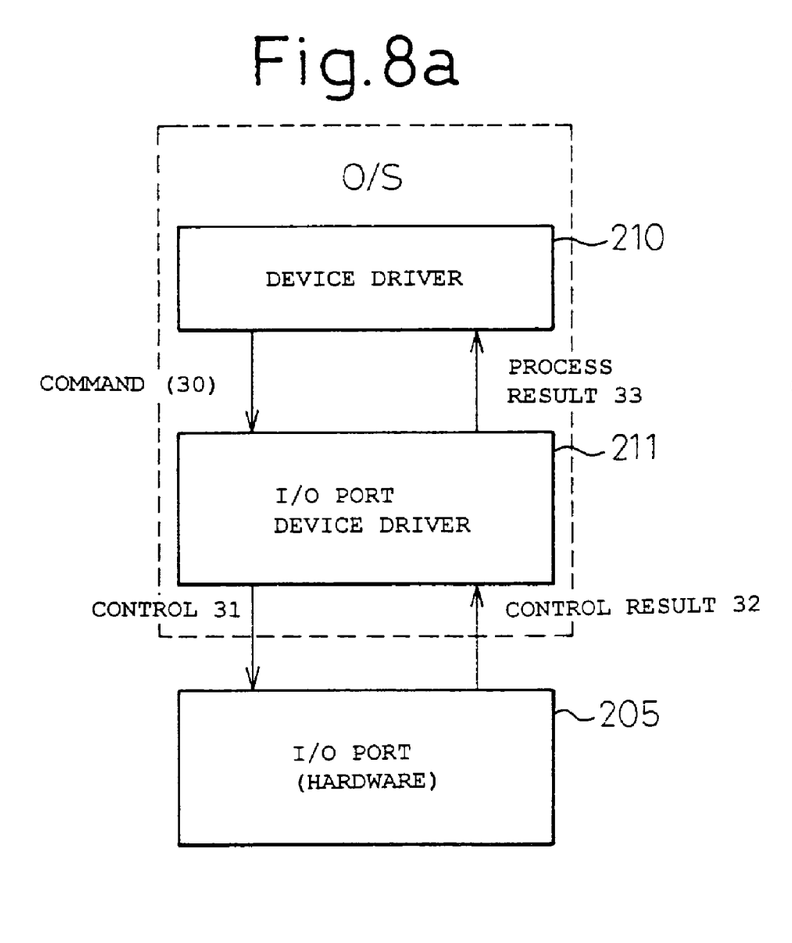
FIG. 8*a* shows the interface between the device driver and the I/O port of the conventional server/client system.

FIG. 8a shows the interface configuration between the device driver 210 and the I/O port 205 (hardware) of the conventional server/client system. As shown in this figure, there is an I/O port device driver 211 between the device driver 210 and the I/O port 205 to accommodate the hardware differences, and thus the operation of the device driver 210 to the I/O port 205 is performed by means of an abstracted command 30. The I/O port device driver 211 controls (31) the I/O port 205 (hardware) according to this command 30, receives the control result 32 from the I/O port 205, and then sends the process result 33 to the device driver 210.

Figure 8B:
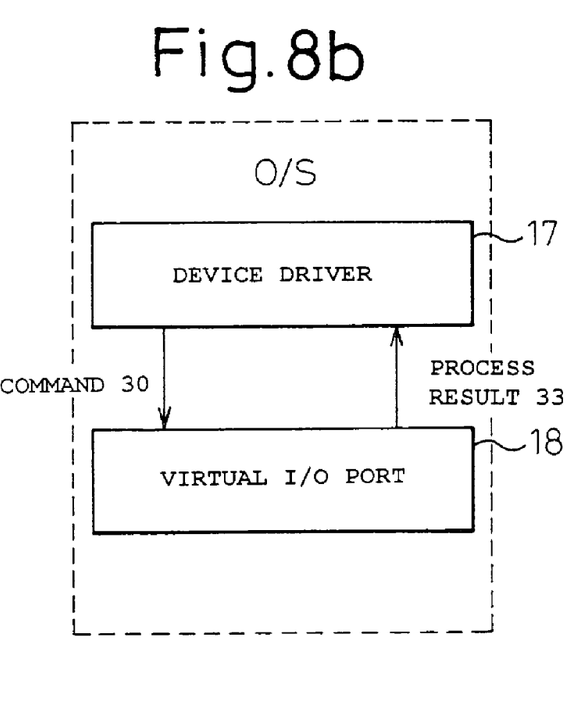
FIG. 8*b* shows the interface between the device driver and the virtual I/O port of the server/client system according to the present invention shown in FIG. 2 and FIG. 3.

In the server/client system of this embodiment shown in FIG. 2 and FIG. 3, the virtual I/O port 18 is configured, as shown in FIG. 8b, so as to have the interfaces for the command 30 and process result 33 shown in FIG. 8a for the device driver 17. For this reason, the API (Application Programming Interface) environment for the device driver 210 provided by the O/S of the conventional server/client system may also be provided for the device driver 17 by the O/S of this embodiment. As a result, it is possible, in this embodiment, to control the I/O device 4 by using the device driver 17 as with the conventional device driver 210.

As mentioned above, in the server/client system of this embodiment, conventional device drivers may be used in the server as they are, and thus existing resources may be used effectively.

Figure 9:
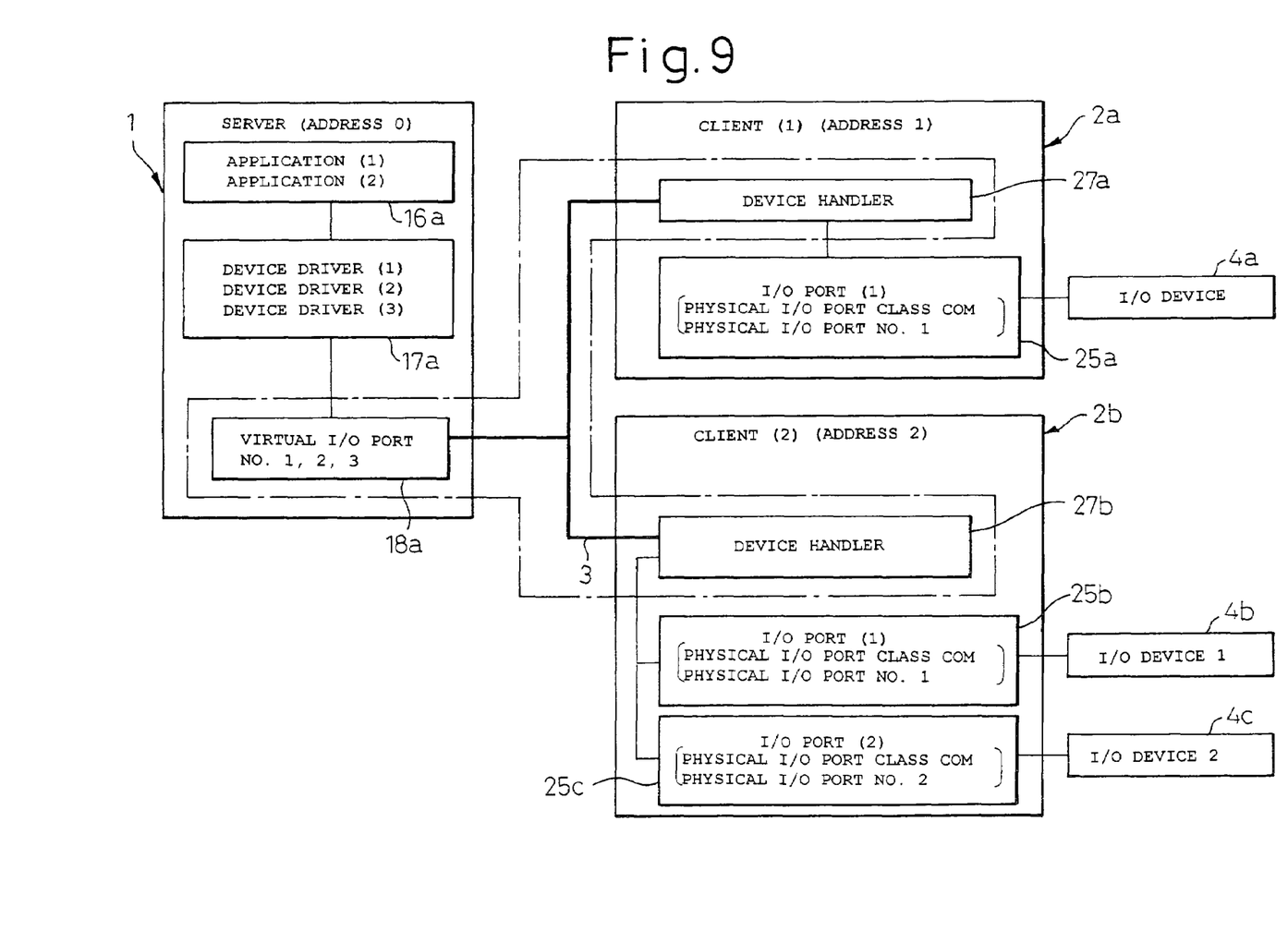
FIG. 9 is a block diagram showing the configuration of a second embodiment of a server/client system according to the present invention.

FIG. 9 is a block diagram showing the configuration of the second embodiment of the present invention. In this embodiment, as shown in the figure, two clients, clients 2a and 2b, the hardware/software requirements of which have been reduced according to the present invention, are connected to one server 1. The number of clients connected to one server is not limited to two as shown in the figure, and it is needless to say that any number of clients may be connected to one server.

In the embodiment shown in the figure, the client 2a is provided with a device handler 27a and an I/O port 25a, and connected to an I/O device 4a via the I/O port 25a.

The client 2b is provided with a device handler 27b, and two I/O ports, I/O port (1) and I/O port (2), which are connected to an I/O device 4b and I/O device 4c respectively.

In the server 1, the application 16a includes application (1) used by the client 2a and application (2) used by the client 2b. The device driver 17a includes device driver (1) for driving the I/O device 4a connected to the client 2a, device driver (2) for driving the I/O device 4b connected to the client 2b, and device driver (3) for driving the I/O device 4c connected to the client 2b.

In this embodiment, the virtual I/O port 18a has a function to set the virtual I/O port numbers in the virtual I/O port 18a, the addresses on the communication line of the clients 2a and 2b, and the classes and numbers of physical I/O ports of the clients 2a and 2b, in order to distinguish the clients 2a and 2b connected to the server 1 via the communication line 3, and to distinguish the I/O ports 25a, 25b and 25c.

Figure 10:
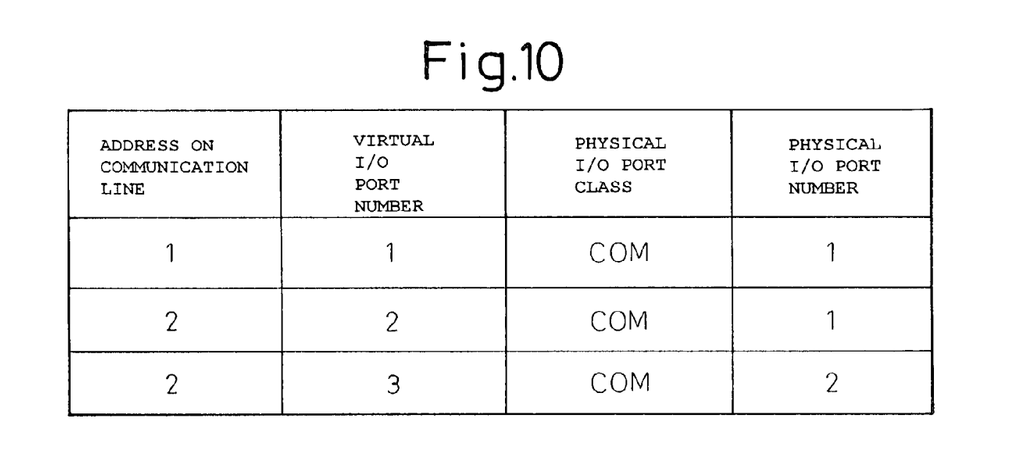
FIG. 10 depicts a function of the virtual I/O port of the server/client system shown in FIG. 9.

FIG. 10 shows the set information in the system shown in FIG. 9. The set information is included in response (12) in FIG. 5.

According to the set information shown in FIG. 10, client (1) 2a is designated with address 1 on a communication line, and client (2) 2b is designated with address 2 on a communication line. The I/O port 25a of client (1) 2a is designated with physical I/O port class COM and physical I/O port number 1. Two I/O ports 25b and 25c of client (2) 2b are designated with physical I/O port numbers 1 and 2 respectively. The mapping information allows a one-to-one correspondence between the physical I/O port class and number of the client, and the number which is set as virtual I/O port number. For example, in the example in FIG. 10, physical I/O port class and number COM1 for client (1) 24 corresponds to virtual I/O port number 1. Further, COM1 and COM2 for client (2) 2b are in one-to-one correspondence with virtual I/O port numbers 2 and 3 respectively.

In the system in FIG. 9, when the power is supplied to client (1) 2a, the device handler 27a is started, and connection between address 0 (server 1) and address 1 (client 2a) on the communication line is established via the virtual I/O port 18a. After that, data transmission between the virtual I/O port 18a and the device handler 27a is performed on this connection. The process from the device driver 17a to the I/O port 25a is accepted as a process to the I/O port 25a by the virtual I/O port 18a, and COM1 designating the I/O port 25a is added to the process message to be transmitted to the device handler 27a. In the device handler 27a, the I/O port 25a is distinguished from the information COM1 added to the process message, and the process for the I/O port 25a is performed.

On the other hand, for the event which has occurred at the I/O port 25a, 1 is added to the process message by the device handler 27a, and then the event is transmitted to the virtual I/O port 18a in the form of packet. Thus, virtual I/O port number 1 is recognized by the virtual I/O port 18a, and the occurrence of the event is noticed to device driver (1) corresponding to virtual I/O port number 1.

The process for the client 2b is also performed on the connection between address 0 and address 2 on the communication line. That is, between the virtual I/O port 18a and I/O port 25b, virtual I/O port number 2 is in one-to-one correspondence with COM1, and virtual I/O port number 3 is in one-to-one correspondence with COM2. Thus, to the process message which travels on the connection between address 0 and address 2, virtual I/O port 2 and COM1, or, virtual I/O port 3 and COM2 are added, and the I/O port 25b or I/O port 25c is designated.

In the server/client system of this embodiment, a plurality of clients having a plurality of I/O ports may be controlled under one umbrella by one server in the way as mentioned above. In this case, as the device drivers for the conventional system may be used as the device drivers for two or more kinds of I/O devices connected to a plurality of clients, and may be operated on the server without any modification, all versions of the device drivers may be confirmed and controlled at the server.

In the server/client system in FIG. 9, adding a diagnosis indicating function and a result displaying function to the virtual I/O port 18a allows all clients to be diagnosed under one umbrella by the server. That is, with start of the diagnosis by the user, the virtual I/O port 18a transmits the diagnosis command to the designated client, e.g., client (1) 2a, and allows the device handler 27a in the client 2a to execute the diagnosis of the I/O port 25a, the I/O device 4a, and the client hardware. Result of the diagnosis is transmitted to the virtual I/O port 18a, and displayed as a diagnosis result.

Figure 11:
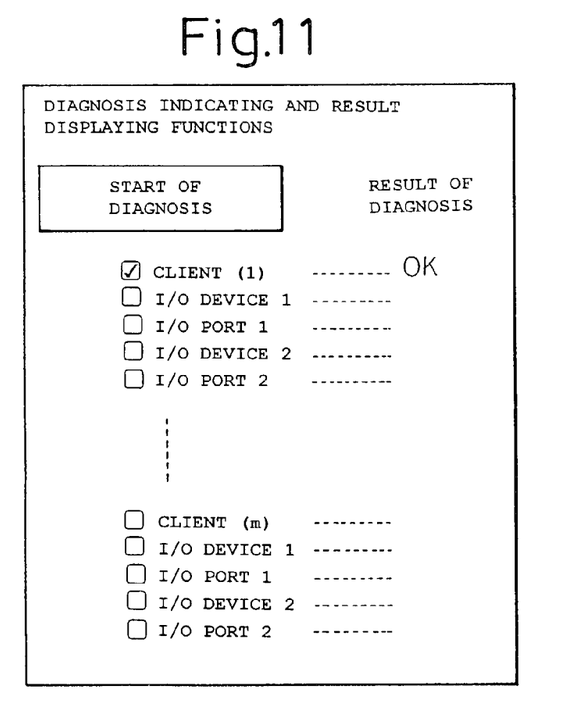
FIG. 11 depicts other functions of the virtual I/O port of the server/client system shown in FIG. 9.

FIG. 11 shows an example of a diagnosis menu used with this diagnosis function. In this system, the virtual I/O port 18a has a setting function of designating each I/O port of each client as mentioned above, and consequently, with start of the diagnosis of this system by the user of the virtual I/O port 18a, the diagnoses of the designated I/O devices, I/O ports, and clients are performed. At first, the virtual I/O port 18a transmits the diagnosis command to the designated client, e.g., the client 2a, and as soon as the device handler receives the transmitted command, it transmits the response to the command to the virtual I/O port 18a. If the virtual I/O port 18a could not receive this response, it is assumed that the power to the client 2a has been lost, or, there is an abnormal condition on the communication line or the client 2. This abnormal condition is indicated, for example, on the display of the server 1.

When the device handler 27a receives the diagnosis command, it interprets the contents of the command and, in case that the command means the diagnosis of, for example, the I/O device 4a, the device handler 27a performs the diagnosis supported by it, and transmits the result of the diagnosis to the virtual I/O port 18a. For example, in case that the I/O port 27a is a serial port, an internal loop-back diagnosis, etc. is performed, and the result of the diagnosis is transmitted to the virtual I/O port 18a. When the virtual I/O port 18a receives the result of the diagnosis, the result is indicated, for example, on the display of the server.

In the above diagnosis process, as the virtual I/O port 18a is able to distinguish each client and each I/O port on an individual basis, diagnoses of all the clients may be executed under one umbrella by the server.

In the embodiment shown in FIG. 9, when the platform (hardware, O/S, etc.) of any one of the clients is modified, the device handler thereof must be newly recreated, but the procedure of establishing the connection on the virtual I/O port 18a and the communication line, the method of receiving the process message from the virtual I/O port 18a, the format of the process result message including I/O port numbers and classes to the virtual I/O port 18a, and the format of the event message are not modified. In addition, also in the system having aforementioned diagnosis function, the method of receiving the diagnosis command, the format of the response message, and the format of diagnosis result message are also not modified. Consequently, even if the platform of any one of the clients is modified, the server is not modified, and thereby modifications of the platform of any one of the clients may be accommodated with flexibility.

EFFECT OF THE INVENTION

As described above, according to the present invention, the applications and device drivers used in the client of the conventional server/client system may be transferred to the server without any modification. Thus, the burden on the client may be reduced, and consequently the requirements for hardware resources may be considerably reduced. For this reason, it is possible to construct a server/client system having a thin client in the conventional API environment.

Furthermore, since the server is not modified even if the platform of the client is modified, the modification of the platform may be accommodated with flexibility.

If the server/client system according to the present invention as mentioned above is applied to a POS system, etc. in which several clients are controlled by one server, as each client is reduced in the hardware/software requirements considerably, the cost for constructing the whole system as well as the cost for operating the system may be considerably reduced. Furthermore, since the modifications of each platform may be accommodated with flexibility, the burden of cost at design change of the POS system may be considerably reduced.

The invention claimed is:

1. A server/client system comprising:
  a server;
  at least one client which is connected to said server via a communication line, and which is provided with at least one I/O port,
  wherein said server includes an existing application used in a conventional server/client system, a device driver and a virtual I/O port configured to provide said device driver with an interface having the same function as said I/O port, and said at least one client includes a device handler;
  wherein said device driver is configured to generate an input/output control signal to control the at least one I/O port in said client upon reception of an input/output processing request generated by said application and to transmit said input/output control signal to said virtual I/O port;
  wherein said device driver is also configured to receive an event generated by said I/O port from said virtual I/O port and to notice said event to said application; and
  wherein the device handler in said client is configured to receive said input/output control signal from said virtual I/O port, to transmit said input/output control signal to said I/O port, to receive said event from said I/O port and to transmit said event to said virtual I/O port via said communication line.

2. The server/client system of claim 1 wherein said virtual I/O port transmits the input/output control signal transmitted from said device driver to said device handler through said communication line in the form of an input/output control packet.

3. The server/client system of claim 1, wherein said device handler transmits the I/O port event received through said I/O port to said virtual I/O port through said communication line in the form of an event packet.

4. The server/client system of claim 1, wherein said server includes existing device drivers used in a conventional server/client system.

5. The server/client system of claim 1, wherein said virtual I/O port has a function of distinguishing the address on the communication line of said client and the class and number of said I/O port.

6. The server/client system of claim 1, wherein said virtual I/O port has a function of diagnosing the hardware of said client.

7. The server/client system of claim 1, wherein said communication line is a LAN.

8. The server/client system of claim 1, comprising one server and m (m is an integer of 2 or more) clients which each has at least one I/O port, wherein said server is provided with all applications used in said clients and all device drivers for controlling said I/O ports.

* * * * *